US011967332B2

(12) United States Patent
Tadesse et al.

(10) Patent No.: US 11,967,332 B2
(45) Date of Patent: Apr. 23, 2024

(54) METHOD AND SYSTEM FOR AUTOMATIC DETECTION AND CORRECTION OF SOUND CAUSED BY FACIAL COVERINGS

(71) Applicant: International Business Machines Corporation, Armonk, NY (US)

(72) Inventors: Girmaw Abebe Tadesse, Nairobi (KE); Michael S. Gordon, Yorktown Heights, NY (US); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/477,592

(22) Filed: Sep. 17, 2021

(65) Prior Publication Data

US 2023/0086832 A1 Mar. 23, 2023

(51) Int. Cl.

*G10L 21/0232* (2013.01)
*G10L 25/60* (2013.01)
*G10L 25/75* (2013.01)

(52) U.S. Cl.

CPC .......... *G10L 21/0232* (2013.01); *G10L 25/60* (2013.01); *G10L 25/75* (2013.01)

(58) Field of Classification Search

CPC ..... G10L 21/0232; G10L 25/60; G10L 25/27; G10L 15/22; G10L 15/00; G06N 3/40
See application file for complete search history.

(56) References Cited

U.S. PATENT DOCUMENTS 6,382,206 B1 5/2002 Palazzotto
9,498,658 B2 11/2016 Kihlberg
9,950,201 B2 4/2018 Zimmerman
10,786,695 B2 9/2020 Gabriel
11,295,759 B1 * 4/2022 Rothenberg ............ G10L 25/60
11,393,486 B1 * 7/2022 Woodruff ................ G10L 21/02
2009/0192799 A1 7/2009 Griffin
(Continued)

FOREIGN PATENT DOCUMENTS

JP 2022131511 A 9/2022

OTHER PUBLICATIONS

G. S. Kang and T. M. Moran, "Speech enhancement in noise and within face mask (microphone array approach)," Proceedings of the 1998 IEEE International Conference on Acoustics, Speech and Signal Processing, ICASSP '98 (Cat. No. 98CH36181), 1998, pp. 1017-1020 vol. 2, doi: 10.1109/ICASSP.1998.675440. (Year: 1998).*
(Continued)

*Primary Examiner* — Paras D Shah
(74) *Attorney, Agent, or Firm* — Daniel J Blabolil

(57) ABSTRACT

A computer-implemented method for correcting muffled speech caused by facial coverings is disclosed. The computer-implemented method includes monitoring a user's speech for speech distortion. The computer-implemented method further includes determining that the user's speech is distorted. The computer-implemented method further includes determining that a cause of the user's speech distortion is based, at least in part, on a presence of a particular type of facial covering. The computer-implemented method further includes automatically correcting the speech distortion of the user based, at least in part, on the particular type of facial covering causing the speech distortion.

20 Claims, 5 Drawing Sheets

(56) References Cited

U.S. PATENT DOCUMENTS

| | | | | |
|---|---|---|---|---|
| 2014/0081631 | A1* | 3/2014 | Zhu | G10L 21/0208 704/226 |
| 2017/0169828 | A1* | 6/2017 | Sachdev | G10L 25/93 |
| 2017/0368383 | A1 | 12/2017 | Riccio | |
| 2018/0035214 | A1 | 2/2018 | Cevette | |
| 2019/0080710 | A1 | 3/2019 | Zhang | |
| 2020/0066296 | A1 | 2/2020 | Sargsyan | |
| 2020/0152190 | A1* | 5/2020 | Itkowitz | G16H 20/40 |
| 2020/0410993 | A1* | 12/2020 | Mäkinen | H04R 1/406 |
| 2021/0329389 | A1* | 10/2021 | Pandey | H04R 25/70 |
| 2022/0343934 | A1* | 10/2022 | Lynch | H03G 5/165 |

OTHER PUBLICATIONS

Branda, Eric. "Improving communication with face masks." Signia White Paper 326 (2020).*

"Communicating Effectively While Wearing Masks and Physical Distancing", ASHA, downloaded from the Internet on Jun. 16, 2021, 3 pages, <https://www.asha.org/public/communicating-effectively-while-wearing-masks-and-physical-distancing/>.

"Face Mask with Microphone and Speaker for Speech Enhancement", Technical Disclosure Commons, Defensive Publications Series, Jan. 2021, 5 pages, <https://www.tdcommons.org/dpubs_series/3961>.

"Hearing Aids—Styles/Types & How They Work", NIDCD, NIH Pub. No. 13-4340, Last updated Mar. 6, 2017, 7 pages, <https://www.nidcd.nih.gov/health/hearing-aids#:~:text=A%20hearing%20aid%20is%20a,both%20quiet%20and%20noisy%20situations>.

"How Do Medical Masks Degrade Speech Reception?", Hearing Review, Apr. 1, 2020, 12 pages, <https://www.hearingreview.com/hearing-loss/health-wellness/how-do-medical-masks-degrade-speech-reception#:~:text=The%20data%20show%20that%20each,dB%20for%20the%20N95%20masks>.

Corey, Ryan M., "Face masks make it harder to hear, but amplification can help", Innovation in Augmented Listening Technology, Aug. 11, 2020, 5 pages, <https://publish.illinois.edu/augmentedlistening/face-masks/>.

Mell et al., "The NIST Definition of Cloud Computing", Recommendations of the National Institute of Standards and Technology, NIST Special Publication 800-145, Sep. 2011, 7 pages.

Mheidly et al., "Effect of Face Masks on Interpersonal Communication During the COVID-19 Pandemic", Front Public Health, 2020, Published online Dec. 9, 2020, Received Jul. 13, 2020; Accepted Nov. 17, 2020, doi: 10.3389/fpubh.2020.582191, 10 pages, <https://www.ncbi.nlm.nih.gov/pmc/articles/PMC7755855/>.

Saeidi et al., "Analysis of Face Mask Effect on Speaker Recognition", Interspeech 2016, Sep. 12, 2016, 5 pages.

* cited by examiner

METHOD AND SYSTEM FOR AUTOMATIC DETECTION AND CORRECTION OF SOUND CAUSED BY FACIAL COVERINGS

BACKGROUND

The present invention relates generally to the field of sound distortion, and more particularly to automatically detecting and correcting muffled speech caused by facial coverings.

The term distortion refers to a deviation of the original form of something. In communications, distortion is the alteration of sound waves. Muffled speech is the distortion of one's speech, such as a decrease in sound volume or the stifling of more high-frequency sounds, such as "s" "t," "k," and "sh." The prevalence of muffled speech has become increasingly problematic with the use of facial coverings during the COVID-19 pandemic.

SUMMARY

According to one embodiment of the present invention, a computer-implemented method for correcting muffled speech caused by facial coverings is disclosed. The computer-implemented method includes monitoring a user's speech for speech distortion. The computer-implemented method further includes determining that the user's speech is distorted. The computer-implemented method further includes determining that a cause of the user's speech distortion is based, at least in part, on a presence of a particular type of facial covering. The computer-implemented method further includes automatically correcting the speech distortion of the user based, at least in part, on the particular type of facial covering causing the speech distortion.

According to another embodiment of the present invention, a computer program product for correcting muffled speech caused by facial coverings is disclosed. The computer program product includes one or more computer readable storage media and program instructions stored on the one or more computer readable storage media. The program instructions include instructions to monitor a user's speech for speech distortion. The program instructions further include instructions to determine that the user's speech is distorted. The program instructions further include instructions to determine that a cause of the user's speech distortion is based, at least in part, on a presence of a particular type of facial covering. The program instructions further include instructions to automatically correct the speech distortion of the user based, at least in part, on the particular type of facial covering causing the speech distortion.

According to another embodiment of the present invention, a computer system for correcting muffled speech caused by facial coverings is disclosed. The computer system includes one or more computer processors, one or more computer readable storage media, and computer program instructions, the computer program instructions being stored on the one or more computer readable storage media for execution by the one or more computer processors. The program instructions include instructions to monitor a user's speech for speech distortion. The program instructions further include instructions to determine that the user's speech is distorted. The program instructions further include instructions to determine that a cause of the user's speech distortion is based, at least in part, on a presence of a particular type of facial covering. The program instructions further include instructions to automatically correct the speech distortion of the user based, at least in part, on the particular type of facial covering causing the speech distortion.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
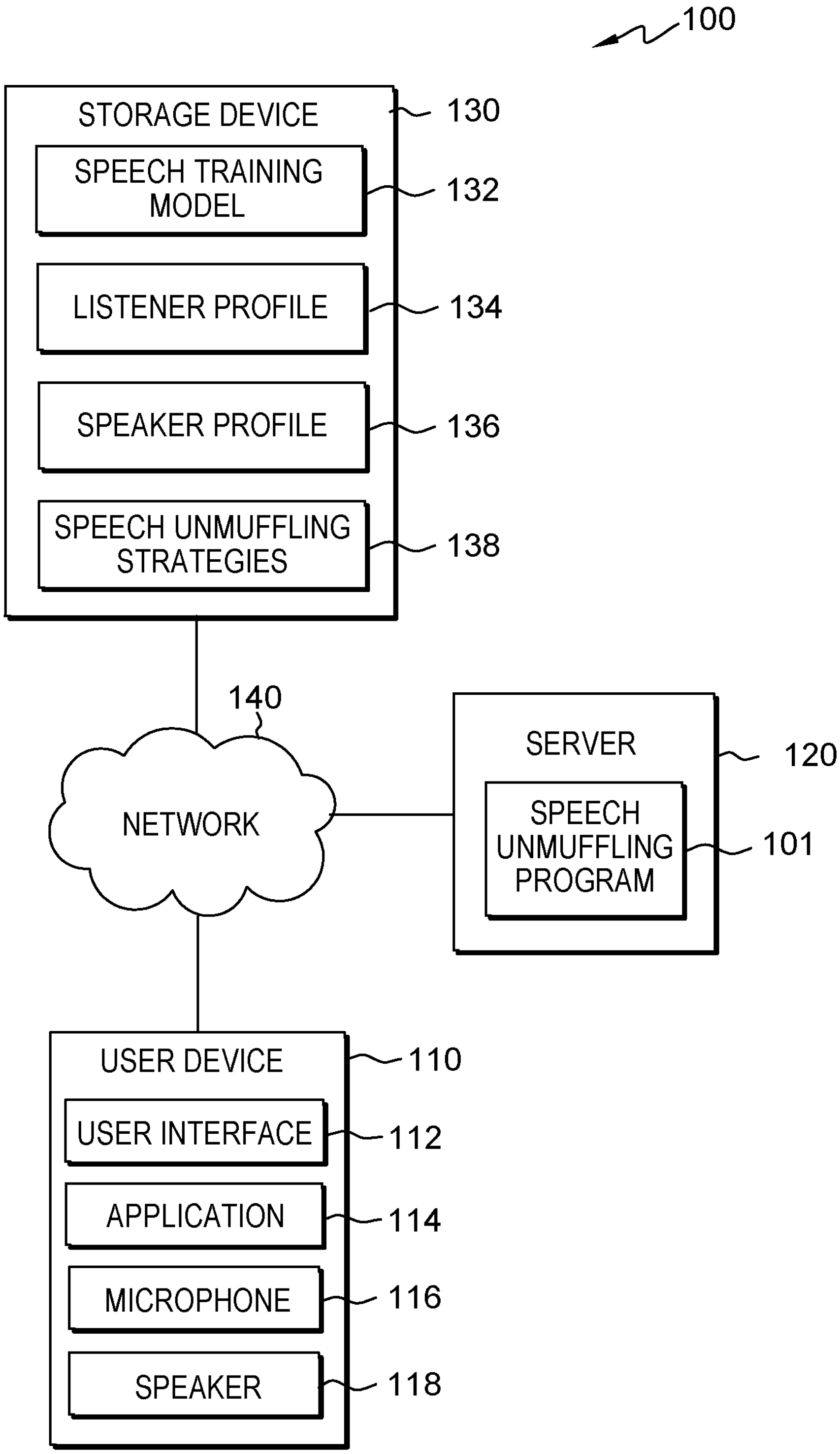
FIG. 1 is a block diagram of a network computing environment for correcting muffled speech caused by facial coverings, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field sound distortion, and more particularly to automatically detecting and correcting muffled speech caused by facial coverings.

Facial coverings are common in many different environmental conditions and settings such as pollution, labs, surgical areas, and everyday settings to prevent the spread of diseases. In an effort to reduce the spread of infectious diseases, face coverings and physical barriers have become increasing popular. The use of facial masks, other physical barriers, and social distancing has increased limits with communication by reducing visual cues, increasing muffling voice sounds, and restricting the muscle movements and adversely changing speech. Many people who experience hearing loss have an increased difficulty with hearing and understanding someone else talking with a face mask on because the face mask restricts lip-reading and the speaker's speech is typically muffled. Embodiments of the present invention recognize different face masks and other physical barriers have different characteristics and distort a speaker's voice in different ways.

Embodiments of the present invention recognize the need for people to be able to safely communicate and understand one other. Embodiments of the present invention improve communication by automatically detecting and correcting muffled sounds of a speaker. Embodiments of the present invention monitor the user's speech and detect speech signal distortion or muffled sound. Embodiments of the present invention improve communication by detecting if the speech signal from a speaker is distorted or muffled compared to a speaker's normal voice without a facial covering or barrier. Embodiments of the present invention determine that the cause of any distortion or muffled speech is due to the acoustic signal characteristics of a mask or other physical barrier. Embodiments of the present invention automatically correct the speaker's speech patterns by taking into consideration the nature of the mask or physical barrier, the speaker's historic sound profile, and environment. Embodiments of the present invention estimate the degree of the user's speech distortion based on the joint analysis of the user's speech signal characteristics, specific facial covering acoustic characteristics, and other environmental factors. Embodiments of the present invention can further estimate the likelihood of the distortion or muffled speech to cause difficulty to understand the user's speech. Embodiments of the present invention can be configured as an opt-in service and may be automatically triggered when muffling of a user's voice is detected when wearing a facial mask or other personal protective covering.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment for correcting muffled speech caused by facial coverings, generally designated 100, in accordance with at least one embodiment of the present invention. In an embodiment, network computing environment 100 may be provided by cloud computing environment 50, as depicted and described with reference to FIG. 4, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In an embodiment, user device 110 can be a mask or facial covering having at least one of a built in microphone and speaker. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 3.

User device 110 further includes user interface 112, application 114, microphone 116, and speaker 118. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

In an embodiment, user device 110 comprises one or more of a hearing aid component, microphone, headphones, amplifier, or speaker. In an embodiment, user device 110 comprises a camera to visualize the movement of the speakers lips and facial expressions covered by a physical barrier. For example, a camera would enhance understanding what the speaker is saying. In an embodiment, speech unmuffling program 101 determines modulation of voice signals to lower frequency bands to a low-pass-filtering characteristics of facial barriers. In an embodiment, speech unmuffling program 101 determines demodulation to reconstruct the original signal.

Application 114 can be representative of one or more applications (e.g., an application suite) that operate on user device 110. In an embodiment, application 114 is representative of one or more applications (e.g., social media applications, web conferencing applications, and email applications) located on user device 110. In various example embodiments, application 114 can be an application that a user of user device 110 utilizes to automatically detect and correct their own muffled speech or the muffled speech of another person. In an embodiment, application 114 can be a client-side application associated with a server-side application running on server 120 (e.g., a client-side application associated with speech unmuffling program 101). In an embodiment, application 114 can operate to perform processing steps of speech unmuffling program 101 1 (i.e., application 114 can be representative of speech unmuffling program 101 operating on user device 110). Some embodiments of the present invention do not include user interface 112 and application 114 in user device 110.

Microphone 116 can be a separate device from or a part of user device 110 that converts sound into an electrical signal. Speaker 118 can be a separate device from or part of user device 110 that generates sound. It should be appreciated that microphone 116 and speaker 118 can be any type of microphone and speaker known in the art.

Although FIG. 1 depicts only a single user device 110 having both microphone 116 and speaker 118, in alternative embodiments, microphone 116 and/or speaker 118 may exist on two different user devices 110. For example, a first user device 110 can be a facial mask having a built in microphone and a second user device 110 can be a speaker or headphones. In another example, a first user device 110 can be a microphone and the second user device 110 can be a smartphone comprising a microphone and speaker.

Server 120 is configured to provide resources to various computing devices, such as user device 110. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

In an embodiment, server 120 includes speech unmuffling program 101. In an embodiment, speech unmuffling program 101 may be configured to access various data sources, such as the listener profile 134 that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, speech unmuffling program 101 enables the authorized and secure processing of personal data. In an embodiment, speech unmuffling program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, speech unmuffling program 101 provides information regarding personal data and the nature (e.g., type, scope, purpose, duration, etc.) of the processing. In an embodiment, speech unmuffling program 101 provides a user with copies of stored personal data. In an embodiment, speech unmuffling program 101 allows for the correction or completion of incorrect or incomplete personal data. In an embodiment, speech unmuffling program 101 allows for the immediate deletion of personal data.

Figure 3:
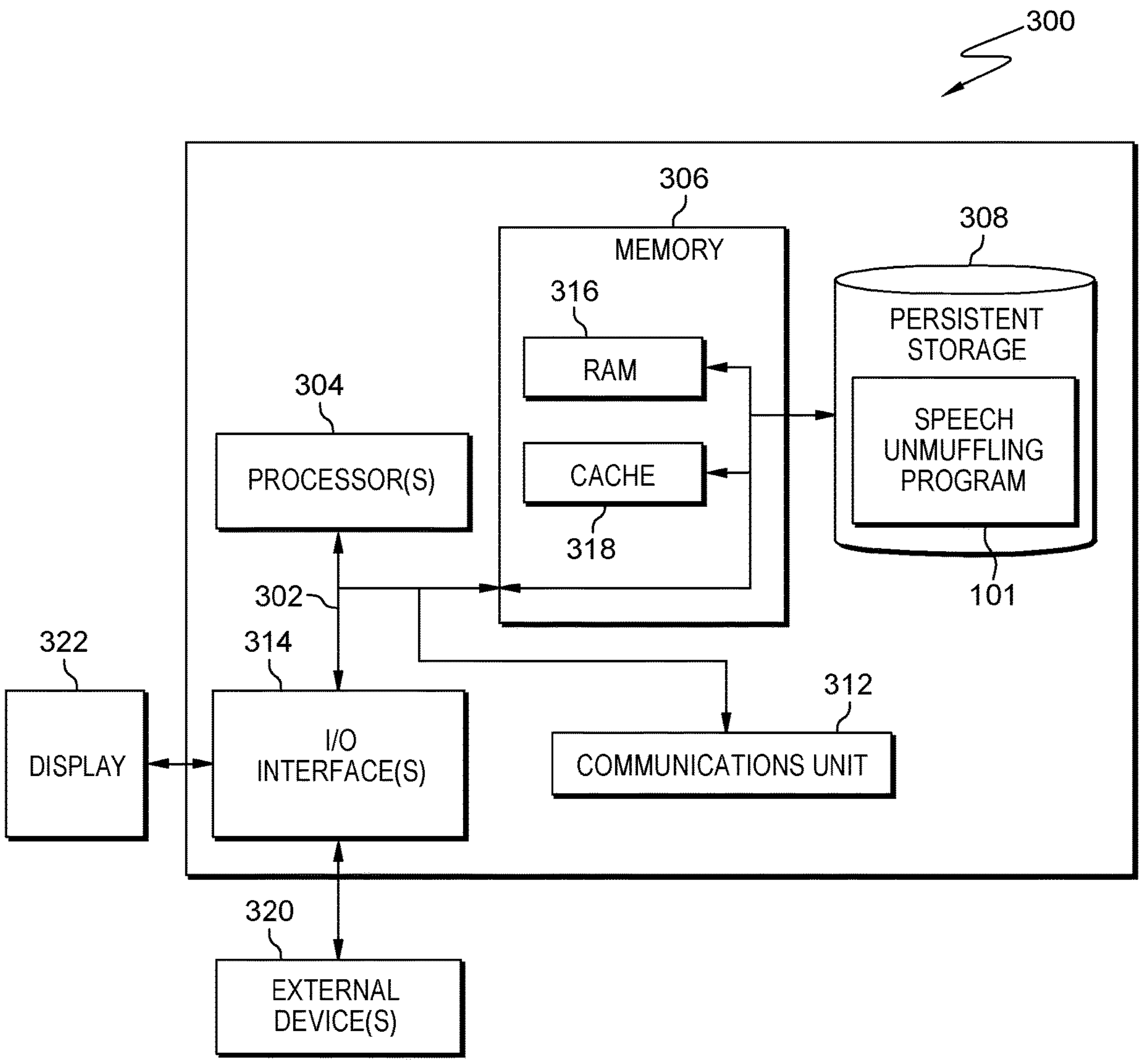
FIG. 3 is a block diagram depicting components of a computer, generally designated 300, suitable for executing a speech unmuffling program 101 in accordance with at least one embodiment of the present invention.
Figure 4:
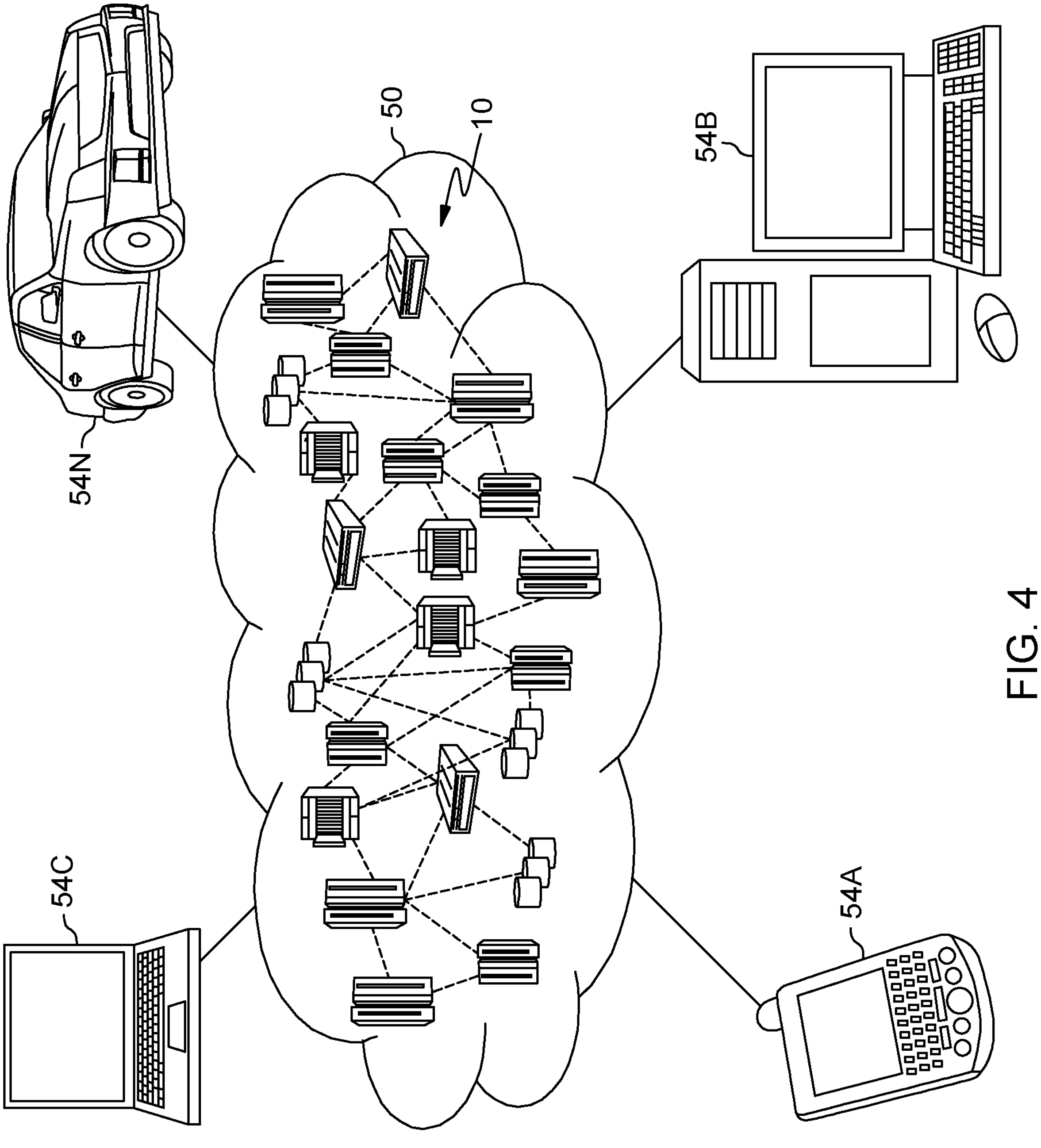
FIG. 4 is a block diagram depicting a cloud computing environment 50 in accordance with at least one embodiment of the present invention.

Server 120 may include components as depicted and described in detail with respect to cloud computing node 10, as described in reference to FIG. 4, in accordance with at least one embodiment of the present invention. Server 120 may include components, as depicted and described in detail with respect to computing device 300 of FIG. 3, in accordance with at least one embodiment of the present invention.

In various embodiments, storage device 130 is a secure data repository for persistently storing users normal speech, acoustic signal characteristics by physical barrier, and unmuffling strategies by various applications and user devices of a user, such as user device 110. In various embodiments, storage device 130 includes speech training model 132, listener profile 134, speaker profile 136, and speech unmuffling strategies 138. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, speech training model 132 is a trained model for detecting muffled speech. In an embodiment, speech training model 132 is a pre-trained model created from user audio (e.g., historical speech waves) produced without the presence of a mask or physical barrier. In an embodiment, speech training model 132 uses machine learning to generate a trained model. In an embodiment, machine learning is used to build a trained model by examining speech patterns for the user or speaker. In an embodiment, speech training model 132 is used to detect artificially muffled speech. In an embodiment, speech training model 132 is trained via long short-term memory (LSTM). LSTM is an artificial recurrent neural network for deep learning. In an embodiment, speech training model 132 is trained using information from the listener profile 134 and speaker profile 136. In an embodiment, information in listener profile 134 and speaker profile 136 is dependent on one or more of the material the physical barrier is made of, the background environment, age, gender, and language of the listener and the speaker.

In an embodiment, speech training model 132 is a trained binary classifier that learns to detect distorted speech by training both muffled and unmuffled speech from a diversity of speakers, environmental conditions, and barrier types. In an embodiment, speech training model 132 is trained based on gender type, different ages, and different facial coverings. In an embodiment, speech training model 132 is trained by the user or speaker indicating their speech with respect to different facial coverings and the absence of any facial coverings. For example, speaker A trains speech training model 132 by speaking without any physical barriers, speaking with facial mask type A, and speaking with facial mask type B on and indicating to speech unmuffling program 101 which sound waves correspond to what facial covering, if any.

In an embodiment, a user can be a listener or a speaker. In an embodiment, the speaker is the user speaking and the user is the user listening. In an embodiment, the speaking user and the listening user can switch throughout the conversation.

In an embodiment, listener profile 134 contains information on a listener's speech profile. In an embodiment the listener is the user listening to the speaker speak. In an embodiment, speaker profile 136 contains information on a speakers speech profile. In an embodiment the speaker is the user speaking to the listener. In an embodiment, listener speech profile 134 and speaker profile 136 include various information about the listener and speaker, such as listener and speakers age, physical barrier characteristics (e.g., the typical types of facial coverings that the users wear), and normal user speech signals or waveforms (e.g., speech signals or waveforms without the presence of a physical barrier, such as a facial covering).

For example, speaker profile 136 contains information on how a user sounds (e.g., the typical or historical speech waveforms of a user) when they speak while wearing different types of facial coverings, when the user's speech is obstructed by different types of physical barriers, and when the user's speech is not obstructed by any facial covering or physical barrier. In an embodiment, listener profile 134 and speaker profile 136 contains information on the degree of muffling or distortion of speech based on the joint analysis of the speech signal characteristics, physical barrier acoustic characteristics, and other environmental factors.

In an embodiment, speech unmuffling strategies 138 contains information on strategies to unmuffle speech. In an embodiment, speech unmuffling strategies 138 contains information on on one or more speech unmuffling policies. In an embodiment, the speech unmuffling policies include a dynamic set of rules for unmuffling speech based on the particular type of facial covering or physical barrier, information included in listener profile 134 and speaker profile 136, and external environment factors. In an embodiment, the speech unmuffling policies includes information describing different decision-making actions speech unmuffling program 101 should perform depending on the particular facial covering and/or physical barrier, information included in listener profile 134 and speaker profile 136, and the surrounding environment in which the user is speaking. For example, speech unmuffling policies may include a different set of rules as to how to unmuffle a speakers speech based on whether they are wearing type A facial mask verses type B facial mask. In another example, speech unmuffling policies may include a different set of rules as to how to unmuffle a speakers speech based on the degree of distortion of the speech. In another example speech unmuffling policies may include a different set of rules as to how to unmuffle a speakers speech based on the likelihood of the distorted speech to cause a listener difficulty in understanding the speech. In an embodiment, the speech unmuffling policies include different unmuffling strategies based on the dominate factor of the muffled speech. For example, if speech unmuffling program 101 determines the environmental conditions or the background noise is the dominant muffling characteristic, speech unmuffling program 101 selects a speech unmuffling policy for when environmental conditions or the background noise is the dominant muffling characteristic.

In an embodiment, speech unmuffling program 101 detects whether a speakers speech signal is distorted or muffled compared to the speakers normal or unmuffled speech. In an embodiment, speech unmuffling program 101 determines that the speaker's speech is distorted due to the acoustic signal characteristics of a user's speech when wearing a particular type facial covering or when present behind a particular type of physical barrier. In an embodiment, speech unmuffling program 101 automatically corrects the speaker's muffled speech patterns based, at least in part, on the acoustic characteristics of the physical barrier, the speakers historical or learned speech patterns when speaking without a facial covering or in the presence of a physical barrier, and the speaker's environment.

In an embodiment, speech unmuffling program 101 learns the speaker's speech waveforms without any physical barriers. For example, a speaker speaks into a microphone without any physical barriers. In an embodiment, speech unmuffling program 101 determines the speakers normal voice by artificial unmuffling with a trained model. In an embodiment, speech unmuffling program 101 determines the speakers distorted speech with one or more physical barriers. For example, speech unmuffling program 101 receives speakers distorted speech waves for one or more physical barriers. For example, speaker speaks into a microphone and identifies their speech with one or more physical barriers.

In an embodiment, speech unmuffling program 101 determines a signal-to-noise ratio (SNR). Signal-to-noise ratio is a measurement used to compare the level of a desired signal to the level of background noise. SNR is defined as the ratio of signal power to the noise power, often expressed in decibels. In an embodiment, speech unmuffling program 101 determines a signal-to-noise-interference-plus ratio (SNIR). Signal-to-noise-interference-plus ratio is a quantity used to give theoretical upper bounds on channel capacity in wireless communication systems such as networks. SINR is defined as the power of a certain signal of interest divided by the sum of the interference power and the power of some background noise.

In an embodiment, speech unmuffling program 101 determines the dominant factor of the distorted speech from the trained model. For example, in a speech wave, the environmental condition or background noise may contribute to the distortion of speech the most and is the dominant factor of the distorted speech. In an embodiment, speech unmuffling program 101 determines a classifier, likelihood, or degree the speech detected is distorted. In an embodiment, speech unmuffling program 101 uses SNR or SNIR to determine the level and qualitative evaluation of the distorted speech.

In an embodiment, speech unmuffling program 101 determines a degree of distortion of a user's speech. In an embodiment, the degree of distortion is scored or scaled based on one or more factors. In an embodiment, the degree of distortion is scored or scaled from low to high. For example, a low distortion score means there is a low amount of noise or distortion in the sound wave and a high distortion score means there is a high amount of noise or distortion in the sound wave. Typically, a higher amount of distortion or noise indicates it is more difficult for a listener to understand a sound wave than a lower amount of distortion or noise. In an embodiment, the degree of distortion is based at least in part on either the speakers profile 136 or the listeners profile 134. For example, if the listeners profile indicates the listener has a hearing problem, the degree of distortion may be higher than a listeners profile without a hearing problem. In an embodiment, the degree of distortion is based at least in part on the material or type of physical barrier. For example, a facial mask with thicker material likely has a higher distortion level than a facial mask with thinner material.

In an embodiment, speech unmuffling program 101 compares the distorted speech to the normal speech. In an embodiment, speech unmuffling program 101 compares the frequency-time characteristics of the clean baseline speech and the detected distorted speech. In an embodiment, speech unmuffling program 101 uses attenuation or distortion level (SNR) and counter process signal. For example, a counter process signal is amplifying or background separation. Sound separation is the process of separating a mixture into isolated sounds from an individual source.

In an embodiment, speech unmuffling program 101 uses machine learning to detect and distinguish noise and clean speech. In an embodiment, speech unmuffling program 101 synthesizes artificially muffled speech from a clean baseline speech by applying different muffling or distortion characteristics. For example, speech unmuffling program 101 generates artificially muffled speech by adding background noise or changing the frequency components to imitate different voice tones to the clean baseline speech.

In an embodiment, speech unmuffling program 101 determines the acoustic signal characteristics of a physical barrier by studying the material of the physical barrier, the background environment, and the profile (e.g., age, gender, language) of the speaker. In an embodiment, speech unmuffling program 101 analyzes the quantitative metrics of a voice signal, e.g., metrics, power spectra and sound pressure level, and a predetermined minimum threshold is used to infer whether or not a voice is muffled.

In an embodiment, speech unmuffling program 101 determines an unmuffling strategy. In an embodiment, speech unmuffling program 101 uses the unmuffled speech of a speaker as a baseline. In an embodiment, speech unmuffling program 101 uses the unmuffled speech of a speaker and other contexts such as speaker profile, language, age, gender, or acoustic characteristics of the physical barrier. In an embodiment, the unmuffling strategy is based, at least in part on, either the speakers profile or the listeners profile. For example, if the listeners profile indicates the listener has a hearing problem, speech unmuffling program 101 selects a strategy for listeners with a hearing problem. In an embodiment, speech unmuffling program 101 uses the acoustic characteristics of the mask, independent of the speaker profile and no clean baseline speech. In an embodiment, speech unmuffling program 101 removes the components of the speech waves that are detected as distorted or muffled speech and do not correspond with the clean baseline speech waves.

Figure 2:
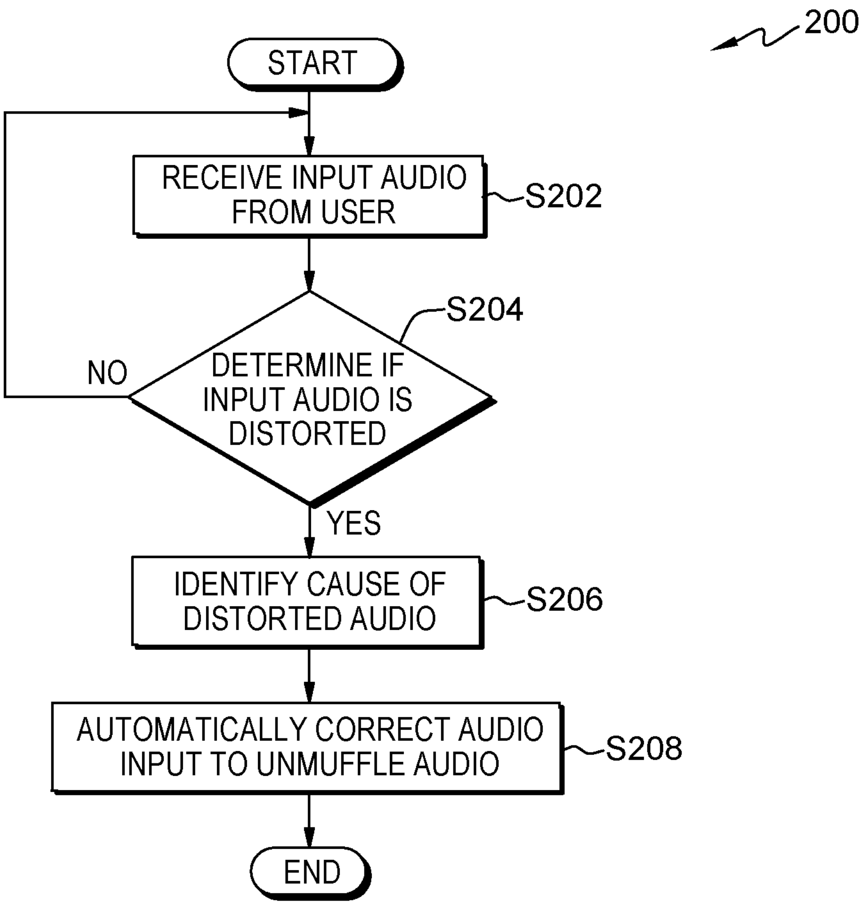
FIG. 2 is a flow chart diagram depicting operational steps for correcting muffled speech caused by facial coverings, generally designated 200, in accordance with at least one embodiment of the present invention.

FIG. 2 is a flow chart diagram depicting operational steps for unmuffling speech, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, speech unmuffling program 101 receives input audio from a user. In an embodiment, speech unmuffling program 101 receives the input audio from a speaker built into a facial covering, such as a facial mask. In an embodiment, speech unmuffling program 101 receives the input audio from a speaker built into a device that is external to a facial covering, such as a smartphone, smartwatch, or headset. In an embodiment, receiving input audio includes monitoring the input audio for distorted speech.

At decision step S204, speech unmuffling program 101 determines whether the input audio is distorted. In an embodiment, speech unmuffling program 101 determines whether the input audio is distorted or muffled based on comparing the speech signals or waveforms of the input audio to the speakers normal or unmuffled speech signals or waveforms (i.e., the speakers speech signals or waveforms without the presence of a physical barrier, such as a facial covering). In an embodiment, speech unmuffling program 101 compares the frequency-time characteristics of the clean baseline speech of the user and the detected distorted speech of the input audio. If it is determined the speech is not muffled (decision step S204 "NO" branch), speech unmuffling program 101 returns to step S202. If it is determined the speech is muffled (decision step S204 "YES" branch), speech unmuffling program 101 proceeds to step S206.

At step S206, speech unmuffling program 101 identifies the cause of the distorted audio. In an embodiment, speech unmuffling program 101 determines the cause of speaker's distorted speech based, at least in part, on comparing the acoustic signal characteristics of a user's speech when wearing a particular type facial covering or when present behind a particular type of physical barrier to the acoustic signal characteristics of the input audio received from the user. In an embodiment, speech unmuffling program 101 determines the dominant factor of the distorted speech.

At step S208, speech unmuffling program 101 automatically corrects the audio input to unmuffle the user's speech. In an embodiment, speech unmuffling program 101 automatically corrects the audio input to unmuffle the user's speech based on one or more speech unmuffling strategies. In an embodiment, correcting the audio input includes removing the components of the speech waves that are detected as distorted or muffled speech and that do not correspond with the clean baseline speech waves.

In an embodiment, speech unmuffling program 101 determines that the user's speech is distorted based, at least in part, on comparing current sound waves of the user's speech to historical sounds waves of the user's speech, and determining that a deviation between the current sound waves of the user's speech and the historical sound waves of the user's speech is above a predetermined threshold.

In an embodiment, speech unmuffling program 101 determines that a cause of the user's speech distortion is based on a presence of a particular type of facial covering based, at least in part, on comparing current soundwaves of the user's speech to one or more trained models for detecting distorted speech associated with the particular type of facial covering.

In an embodiment, speech unmuffling program 101 automatically corrects the speech distortion based, at least in part, on determining one or more acoustic signal characteristics of the user's historical sound waves, and modifying any distorted sound waves of the user to incorporate the one or more acoustic signal characteristics of the user's historical sound waves.

In an embodiment, speech unmuffling program 101 automatically corrects the speech distortion of the user based, at least in part, on comparing current sound waves of the user's speech to historical sound waves of the user's speech, identifying one or more components of the user's current sound waves that deviate from the user's historical sound waves above a predetermined threshold, and removing the one or more components of the user's current sound waves that deviate from the user's historical sound waves above the predetermined threshold.

In an embodiment, speech unmuffling program 101 automatically corrects the distorted speech based, at least in part, on analyzing one or more quantitative metrics associated with the speech distortion, and modifying one or more portions of the user's speech corresponding to the one or more quantitative metrics.

In an embodiment, speech unmuffling program 101 automatically corrects the distorted speech based, at least in part, on determining a dominant factor of the speech distortion.

FIG. 3 is a block diagram depicting components of a computing device, generally designated 300, suitable for speech unmuffling program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes speech unmuffling program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile one or more computer readable storage media.

Program instructions for speech unmuffling program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
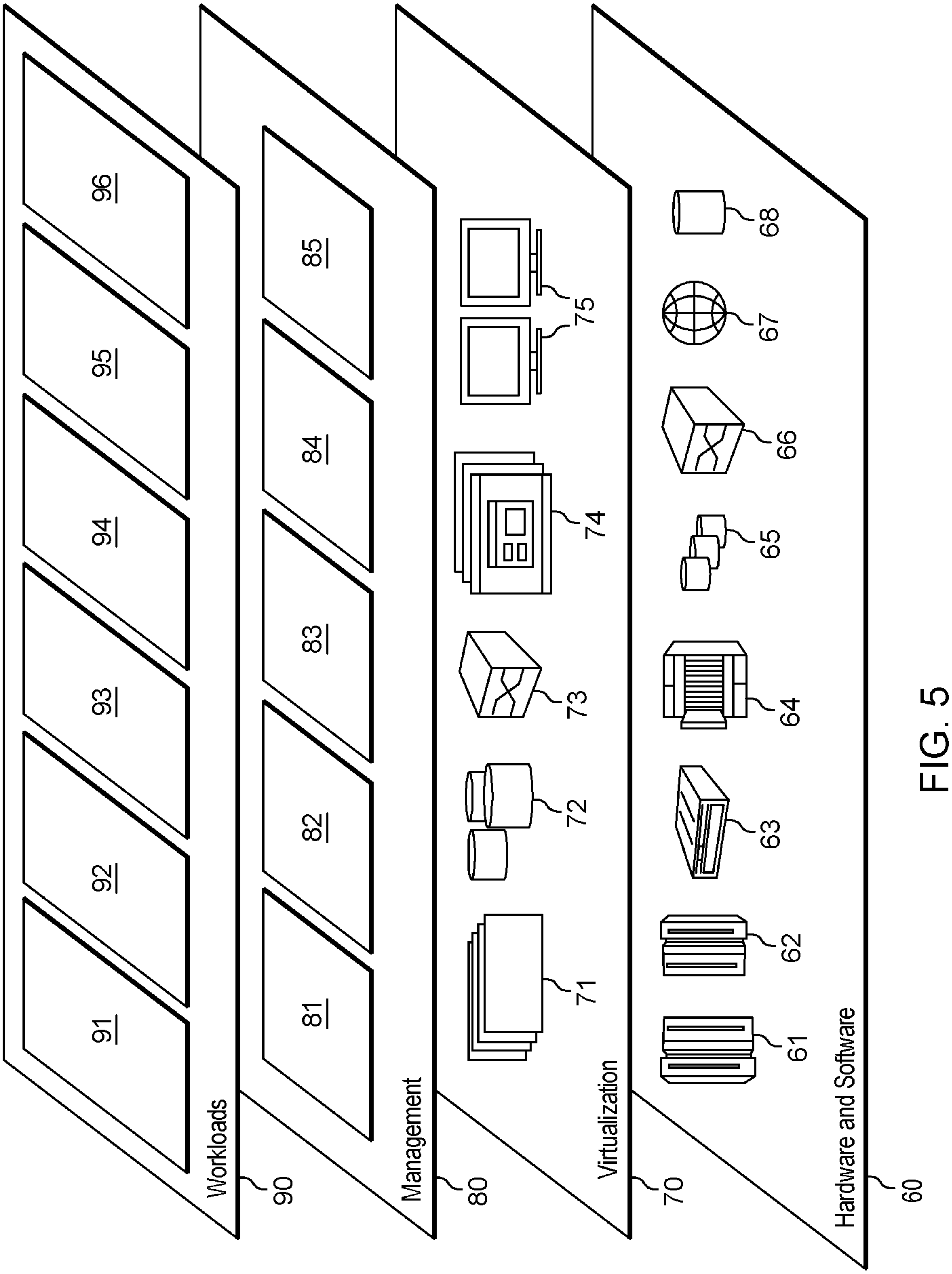
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 4 in accordance with at least one embodiment of the present invention. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and unmuffling speech 96.

What is claimed is:

1. A computer-implemented method for correcting muffled speech caused by facial coverings, the computer-implemented method comprising:

monitoring a user's speech for speech distortion;

determining that the user's speech is distorted;

comparing one or more current soundwaves of the user's speech to a trained model, wherein the trained model is generated based on examining both unmuffled and muffled speech patterns of a user, information from a profile of a listener, information from a profile of the user, and environmental conditions, for detecting distorted speech associated with the particular type of facial covering to determine that a cause of the user's speech distortion is based, at least in part, on a presence of a particular type of facial covering; and automatically correcting the speech distortion of the user based, at least in part, on the particular type of facial covering causing the speech distortion, wherein the automatically correcting the speech distortion of the user comprises selecting one or more speech unmuffling policies, based, at least in part, on acoustic signal characteristics of the particular type of facial covering causing the speech distortion, the unmuffled speech patterns of the user, the environmental conditions, the information found in the profile of the user, and the information found in the profile of the listener.

2. The computer-implemented method of claim 1, wherein determining that the user's speech is distorted based, at least in part, on:

comparing current sound waves of the user's speech to historical sounds waves of the user's speech;

determining that a deviation between the current sound waves of the user's speech and the historical sound waves of the user's speech is above a predetermined threshold; and determining a degree of distortion of the user's speech, wherein the degree of distortion of the user's speech is based on the information found in the profile of the user, the information found in the profile of the listener, and the acoustic signal characteristics of the particular type of facial covering causing the speech distortion.

3. The computer-implemented method of claim 1, wherein automatically correcting the speech distortion is further based, at least in part, on:

determining one or more acoustic signal characteristics of the user's historical sound waves; and modifying any distorted sound waves of the user to incorporate the one or more acoustic signal characteristics of the user's historical sound waves.

4. The computer-implemented method of claim 1, wherein automatically correcting the speech distortion of the user includes:

comparing current sound waves of the user's speech to historical sound waves of the user's speech using the trained model;

identifying one or more components of the user's current sound waves that deviate from the user's historical sound waves above a predetermined threshold; and removing the one or more components of the user's current sound waves that deviate from the user's historical sound waves above the predetermined threshold.

5. The computer-implemented method of claim 1, wherein automatically correcting the speech distortion is further based, at least in part, on:

analyzing one or more quantitative metrics associated with the speech distortion.

6. The computer-implemented method of claim 1, wherein automatically correcting the speech distortion is further based, at least in part, on:

determining a dominant factor of the speech distortion.

7. The computer-implemented method of claim 1, wherein the information found in the profile of the user comprises a material a physical barrier is made of, a background environment, age of the user, gender of the user, language of the user, normal speech signals or waveforms of the user, typical or historical speech waveforms of the user, and information on degree of muffling or distortion of speech based on a joint analysis of speech signal characteristics, physical barrier acoustic characteristics, and other environmental factors.

8. The computer-implemented method of claim 1, wherein the information found in the profile of the listener comprises a likelihood that muffled or distorted speech will cause the listener difficulty in understanding speech, age of the listener, gender of the listener, and language of the listener.

9. The computer-implemented method of claim 1, wherein the one or more current soundwaves of the user's speech comprise an attenuation or distortion level (SNR), and a counter process signal.

10. A computer program product for correcting muffled speech caused by facial coverings, the computer program product comprising one or more computer readable storage media and program instructions stored on the one or more computer readable storage media, the program instructions including instructions to:

monitoring a user's speech for speech distortion;

determining that the user's speech is distorted;

comparing one or more current soundwaves of the user's speech to a trained model, wherein the trained model is generated based on examining both unmuffled and muffled speech patterns of a user, information from a profile of a listener, information from a profile of the user, and environmental conditions, for detecting distorted speech associated with the particular type of facial covering to determine that a cause of the user's speech distortion is based, at least in part, on a presence of a particular type of facial covering; and automatically correcting the speech distortion of the user based, at least in part, on the particular type of facial covering causing the speech distortion, wherein the automatically correcting the speech distortion of the user comprises selecting one or more speech unmuffling policies, based, at least in part, on acoustic signal characteristics of the particular type of facial covering causing the speech distortion, the unmuffled speech patterns of the user, the environmental conditions, the information found in the profile of the user, and the information found in the profile of the listener.

11. The computer program product of claim 10, wherein the instructions to determine that the user's speech is distorted is based, at least in part, on instructions to:

comparing current sound waves of the user's speech to historical sounds waves of the user's speech;

determining that a deviation between the current sound waves of the user's speech and the historical sound waves of the user's speech is above a predetermined threshold; and determining a degree of distortion of the user's speech, wherein the degree of distortion of the user's speech is based on the information found in the profile of the user, the information found in the profile of the listener, and the acoustic signal characteristics of the particular type of facial covering causing the speech distortion.

12. The computer program product of claim 10, wherein the instructions to determine that the user's speech is distorted is based, at least in part, on instructions to:

determine one or more acoustic signal characteristics of the user's historical sound waves; and modify any distorted sound waves of the user to incorporate the one or more acoustic signal characteristics of the user's historical sound waves.

13. The computer program product of claim 10, wherein the instructions to automatically correct the speech distortion of the user includes instructions to:

comparing current sound waves of the user's speech to historical sound waves of the user's speech using the trained model;

identifying one or more components of the user's current sound waves that deviate from the user's historical sound waves above a predetermined threshold; and removing the one or more components of the user's current sound waves that deviate from the user's historical sound waves above the predetermined threshold.

14. The computer program product of claim 10, wherein the instructions to determine that the user's speech is distorted is based, at least in part, on instructions to:

analyze one or more quantitative metrics associated with the speech distortion.

15. The computer program product of claim 10, wherein the instructions to determine that the user's speech is distorted is based, at least in part, on instructions to:

determine a dominant factor of the speech distortion.

16. A computer system for correcting muffled speech caused by facial coverings, comprising:

one or more computer processors;

one or more computer-readable storage media, and computer program instructions, the computer program instructions being stored on the one or more computer readable storage media for execution by the one or more computer processors, the computer program instructions including instructions to:

monitoring a user's speech for speech distortion;

determining that the user's speech is distorted;

comparing one or more current soundwaves of the user's speech to a trained model, wherein the trained model is generated based on examining both unmuffled and muffled speech patterns of a user, information from a profile of a listener, information from a profile of the user, and environmental conditions, for detecting distorted speech associated with the particular type of facial covering to determine that a cause of the user's speech distortion is based, at least in part, on a presence of a particular type of facial covering; and automatically correcting the speech distortion of the user based, at least in part, on the particular type of facial covering causing the speech distortion, wherein the automatically correcting the speech distortion of the user comprises selecting one or more speech unmuffling policies, based, at least in part, on acoustic signal characteristics of the particular type of facial covering causing the speech distortion, the unmuffled speech patterns of the user, the environmental conditions, the information found in the profile of the user, and the information found in the profile of the listener.

17. The computer system of claim 16, wherein the instructions to determine that the user's speech is distorted is based, at least in part, on instructions to:

comparing current sound waves of the user's speech to historical sounds waves of the user's speech;

determining that a deviation between the current sound waves of the user's speech and the historical sound waves of the user's speech is above a predetermined threshold; and determining a degree of distortion of the user's speech, wherein the degree of distortion of the user's speech is based on the information found in the profile of the user, the information found in the profile of the listener, and the acoustic signal characteristics of the particular type of facial covering causing the speech distortion.

18. The computer system of claim 16, wherein the instructions to determine that the user's speech is distorted is based, at least in part, on instructions to:

determine one or more acoustic signal characteristics of the user's historical sound waves; and modify any distorted sound waves of the user to incorporate the one or more acoustic signal characteristics of the user's historical sound waves.

19. The computer system of claim 16, wherein the instructions to automatically correct the speech distortion of the user includes instructions to:

comparing current sound waves of the user's speech to historical sound waves of the user's speech using the trained model;

identifying one or more components of the user's current sound waves that deviate from the user's historical sound waves above a predetermined threshold; and removing the one or more components of the user's current sound waves that deviate from the user's historical sound waves above the predetermined threshold.

20. The computer system of claim 16, wherein the instructions to determine that the user's speech is distorted is based, at least in part, on instructions to:

analyze one or more quantitative metrics associated with the speech distortion.

* * * * *